United States Patent
Meffert

(10) Patent No.: US 9,102,372 B2
(45) Date of Patent: Aug. 11, 2015

(54) TRACK DRIVE SYSTEM AND METHOD

(75) Inventor: Darrel Henry Meffert, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 254 days.

(21) Appl. No.: 13/556,505

(22) Filed: Jul. 24, 2012

(65) Prior Publication Data

US 2014/0032046 A1   Jan. 30, 2014

(51) Int. Cl.
| | |
|---|---|
| *B62D 11/02* | (2006.01) |
| *B62D 55/21* | (2006.01) |
| *E02F 9/20* | (2006.01) |
| *E02F 3/84* | (2006.01) |
| *B62D 55/28* | (2006.01) |

(52) U.S. Cl.
CPC ............... *B62D 55/21* (2013.01); *E02F 3/841* (2013.01); *E02F 9/2079* (2013.01); *E02F 9/2087* (2013.01); *B62D 55/28* (2013.01)

(58) Field of Classification Search
CPC ....... E02F 9/2079; E02F 9/2087; E02F 3/841; B62D 55/21; B62D 55/28
USPC .......... 701/41, 82, 90; 180/9.1, 6.48, 9.5, 6.7, 180/210, 241
See application file for complete search history.

(56) References Cited

U.S. PATENT DOCUMENTS

| | | | |
|---|---|---|---|
| 4,019,596 A | 4/1977 | Crull | |
| 4,086,767 A | 5/1978 | Byers, Jr. | |
| 6,047,227 A * | 4/2000 | Henderson et al. | ............. 701/50 |
| 6,276,768 B1 | 8/2001 | Miller | |
| 7,172,257 B2 * | 2/2007 | Tamaru et al. | ................. 305/145 |
| 7,778,756 B2 * | 8/2010 | Hartwick et al. | ............... 701/50 |
| 7,806,209 B2 * | 10/2010 | Standish et al. | ............... 180/9.5 |
| 7,950,481 B2 * | 5/2011 | Betz et al. | .................. 180/65.31 |
| 7,967,087 B2 | 6/2011 | Arulraja et al. | |
| 7,993,230 B2 | 8/2011 | Stettler, Jr. et al. | |
| 8,100,210 B2 * | 1/2012 | Takeuchi et al. | ............. 180/68.5 |
| 8,316,983 B2 * | 11/2012 | Shirao | ........................... 180/305 |
| 8,504,257 B2 * | 8/2013 | Yamaguchi et al. | ............ 701/50 |

(Continued)

FOREIGN PATENT DOCUMENTS

| | | |
|---|---|---|
| GB | 1051781 | 12/1966 |
| JP | 2000225929 A | 8/2000 |
| JP | 2011169347 A * | 9/2011 |

OTHER PUBLICATIONS

"Inertial Measurement Unit," from www.wikipedia.org, printed Jul. 17, 2012, 2 pages.

*Primary Examiner* — John R Olszewski
*Assistant Examiner* — Truc M Do
(74) *Attorney, Agent, or Firm* — Finnegan, Henderson, Farabow, Garrett & Dunner, LLP

(57) ABSTRACT

The disclosure may provide a method of driving a mobile machine that includes a left-side track assembly and a right-side track assembly for propelling the machine and an implement for performing work. The method may include determining whether the machine is traveling approximately straight forward or backward, and determining whether a load exerted on the implement is less than a threshold load value. A signal may be output, with a controller, to adjust a speed of the left-side track assembly or a speed of the right-side track assembly when the machine is traveling approximately straight forward or backward and the load exerted on the implement is less than the threshold load value, to thereby bring the left-side track assembly out of phase with the right-side track assembly.

20 Claims, 3 Drawing Sheets

(56) References Cited

U.S. PATENT DOCUMENTS

| | | | | |
|---|---|---|---|---|
| 8,532,888 B2* | 9/2013 | Ishibashi et al. | | 701/51 |
| 8,666,610 B2* | 3/2014 | Shirao | | 701/50 |
| 8,706,364 B2* | 4/2014 | Shirao | | 701/50 |
| 8,718,897 B2* | 5/2014 | Wright et al. | | 701/89 |
| D719,588 S * | 12/2014 | Meyer et al. | | D15/28 |
| 2002/0003376 A1 | 1/2002 | Yoshida et al. | | |
| 2002/0029566 A1* | 3/2002 | Sawada et al. | | 60/459 |
| 2002/0070056 A1* | 6/2002 | Wilcox | | 180/6.7 |
| 2002/0079738 A1* | 6/2002 | Doyle | | 305/185 |
| 2003/0226697 A1* | 12/2003 | Haringer | | 180/9.1 |
| 2005/0071067 A1* | 3/2005 | Guven et al. | | 701/54 |
| 2006/0082218 A1* | 4/2006 | Park et al. | | 305/139 |
| 2006/0158034 A1* | 7/2006 | Standish et al. | | 305/135 |
| 2006/0172853 A1* | 8/2006 | Ishibashi et al. | | 477/52 |
| 2006/0243180 A1* | 11/2006 | Sundermeyer et al. | | 112/470.06 |
| 2006/0245896 A1* | 11/2006 | Alshaer et al. | | 414/685 |
| 2006/0276948 A1* | 12/2006 | Toda | | 701/50 |
| 2007/0080236 A1* | 4/2007 | Betz et al. | | 237/12.1 |
| 2007/0179698 A1* | 8/2007 | Oehme | | 701/82 |
| 2007/0260380 A1* | 11/2007 | Mintah et al. | | 701/50 |
| 2007/0287589 A1* | 12/2007 | Kadono et al. | | 477/110 |
| 2008/0104954 A1* | 5/2008 | Schifferer et al. | | 60/431 |
| 2008/0153662 A1* | 6/2008 | Dabbs et al. | | 477/7 |
| 2008/0208416 A1* | 8/2008 | Yuet et al. | | 701/50 |
| 2008/0262682 A1* | 10/2008 | Bergsten | | 701/50 |
| 2008/0269011 A1* | 10/2008 | Sopko et al. | | 477/34 |
| 2009/0101101 A1* | 4/2009 | Iwamoto | | 123/198 |
| 2009/0120175 A1* | 5/2009 | Assaf et al. | | 73/114.12 |
| 2009/0223215 A1* | 9/2009 | Kelly et al. | | 60/426 |
| 2009/0247356 A1* | 10/2009 | Hatanaka | | 477/64 |
| 2009/0320461 A1* | 12/2009 | Morinaga et al. | | 60/431 |
| 2010/0089051 A1* | 4/2010 | Ohtsukasa | | 60/451 |
| 2010/0100338 A1* | 4/2010 | Vik et al. | | 702/42 |
| 2010/0106382 A1* | 4/2010 | Kodaka et al. | | 701/54 |
| 2010/0138118 A1* | 6/2010 | Tsukada et al. | | 701/50 |
| 2010/0146925 A1 | 6/2010 | Johannsen et al. | | |
| 2010/0154399 A1* | 6/2010 | Bergstrom et al. | | 60/327 |
| 2010/0167873 A1* | 7/2010 | Akiyama et al. | | 477/68 |
| 2010/0186402 A1* | 7/2010 | Ariga et al. | | 60/329 |
| 2010/0317486 A1* | 12/2010 | Hyodo et al. | | 477/52 |
| 2011/0186361 A1* | 8/2011 | Dabbs et al. | | 180/6.48 |
| 2012/0166050 A1* | 6/2012 | Anderson et al. | | 701/51 |
| 2012/0310493 A1* | 12/2012 | Fukuhara et al. | | 701/50 |
| 2013/0192905 A1* | 8/2013 | Janzen et al. | | 180/6.7 |

* cited by examiner

TRACK DRIVE SYSTEM AND METHOD

TECHNICAL FIELD

The current disclosure relates generally to track assemblies for a mobile machine and, more particularly, to a system and a method of driving the track assemblies.

BACKGROUND

A known track-type mobile machine includes track assemblies on both the left side and the right side of the machine, which are used to propel the machine. In general, each track assembly includes a number of track links, connected to one another by track pins, to form an endless or closed track assembly. Shoes, which include grousers that are configured to contact the ground surface under the machine, are connected to the track links. On each side of the machine a sprocket that is driven to rotate by an engine of the machine engages the track assembly to translate the track assembly about spaced-apart pulley mechanisms. As the track links translate about the pulley mechanisms, the grousers of the shoes that are connected to the track links engage the ground surface to transmit torque from the sprockets to the ground surface in a direction opposite the desired travel direction of the machine, thereby propelling the machine. An implement, such as a bucket, a blade, or a fork, is often installed on the front of the machine to work (e.g., dig, shape, etc.) the ground surface or carry material (e.g., dirt, sand, stone, construction debris, pallets, etc.) over the ground surface.

When the track-type mobile machine is traveling straight forward or backward over the ground surface and no load is being exerted on the implement, the track assemblies slip relative to one another, such that the shoes and grousers on the left side and the right side of the machine end up in phase with one another. Thus, the grousers on the left side of the machine end up coming into and out of contact with the ground surface at the same time as the grousers on the right side of the machine. When the track assemblies are in phase, the machine may experiences a significant increase in vertical acceleration (e.g., approximately normal to the horizon), increasing undesired vibrations throughout the machine. These vibrations result in, for example, operator discomfort and fatigue, as well as decreased life of machine components.

U.S. Pat. No. 7,806,209 to Standish et al. is directed to an apparatus and a method to reduce vibrations on a tracked machine. In the Standish patent, each track assembly includes a repositionable roller. The rollers may be used to adjust the caternary hang for each of the track assemblies, so that they are not the same as one another, thereby resulting in reduced vibrations.

The system and the method of driving track assemblies in accordance with the current disclosure, however, may be used when a track-type mobile machine does not include repositionable rollers, and without adjusting caternary hang. The current disclosure may also overcome disadvantages resulting from other known systems and methods.

SUMMARY

The disclosure may provide a method of driving a mobile machine that includes a left-side track assembly and a right-side track assembly for propelling the machine and an implement for performing work. The method may include determining whether the machine is traveling approximately straight forward or backward, and determining whether a load exerted on the implement is less than a threshold load value. A signal may be output, with a controller, to adjust a speed of the left-side track assembly or a speed of the right-side track assembly when the machine is traveling approximately straight forward or backward and the load exerted on the implement is less than the threshold load value, to thereby bring the left-side track assembly out of phase with the right-side track assembly.

The disclosure may further provide method of driving a mobile machine, in which a speed of the left-side track assembly is sensed, and a speed the right-side track assembly is sensed. Whether a difference between the sensed speeds is less than a threshold speed value, and whether a load exerted on the implement is less than a threshold load value, may each be determined. A controller may output a signal to adjust a speed of the left-side track assembly or a speed of the right-side track assembly when the difference between the sensed speeds is less than the threshold speed value and the load exerted on the implement is less than the threshold load value, to thereby bring the left-side track assembly out of phase with the right-side track assembly.

The disclosure may still further provide a controller storing a computer program that, when executed by the controller, performs one of the above or another method of driving a mobile machine.

DETAILED DESCRIPTION

Figure 1:
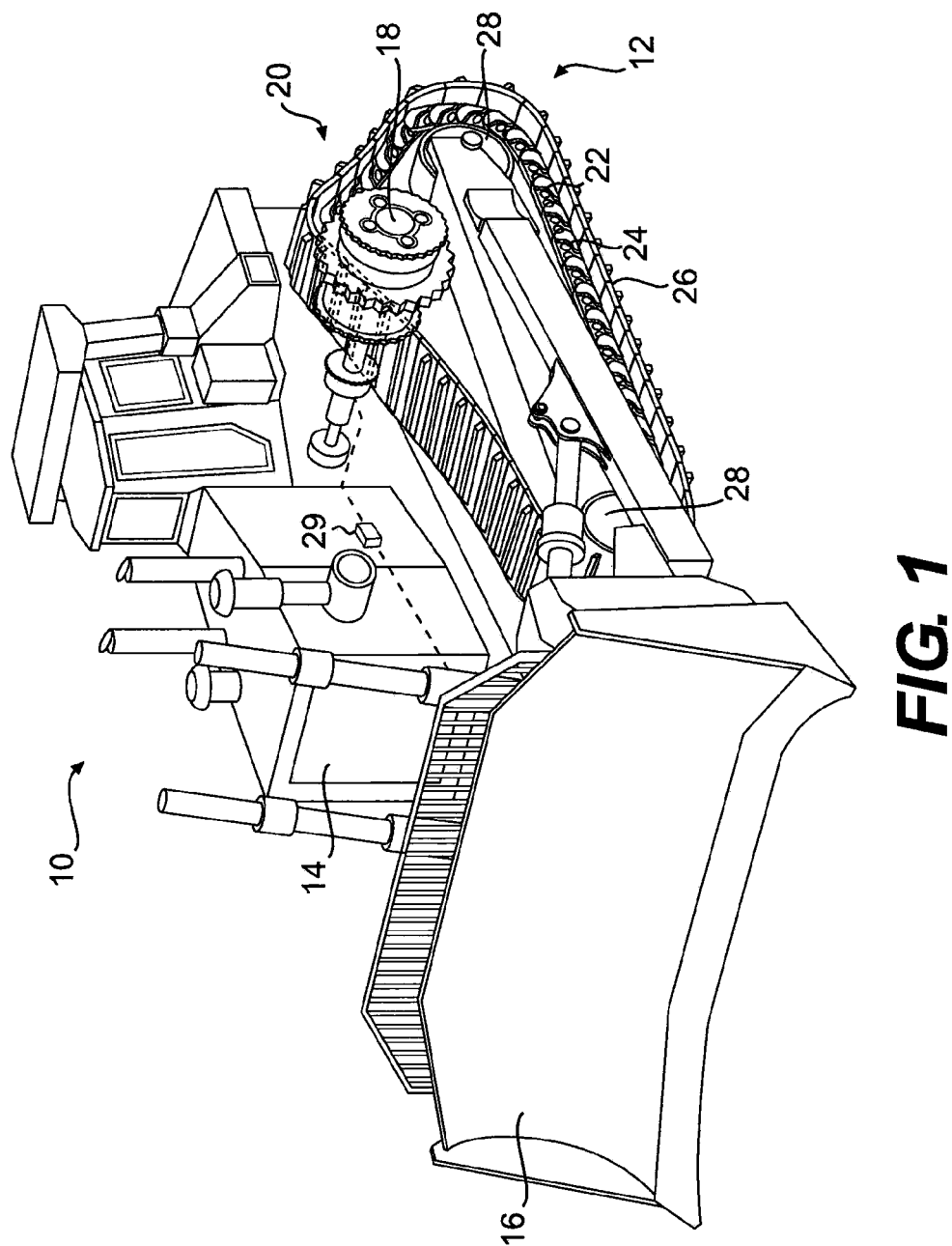
FIG. 1 illustrates an exemplary disclosed mobile machine, consistent with the disclosure.

FIG. 1 illustrates a track-type mobile machine 10 having a tracked undercarriage 12 that is driven over a ground surface by a power source 14. Machine 10 may be any type of machine that performs one or more operations associated with an industry such as mining, excavation, construction, farming, or any other industry. For example, machine 10 may be an earth-moving machine such as a bulldozer, a loader, an excavator, or any other type of earth-moving machine. Machine 10 is not limited to being an earth-moving machine, however, and may be any machine that includes tracks, such as a cold planar, a pipelayer, a tractor, a harvester, or another machine.

Power source 14 may drive tracked undercarriage 12 of machine 10 at a range of output speeds or torque. Power source 14 may be an engine such as, for example, a diesel engine, a gasoline engine, a gaseous fuel-powered engine, or any other type of engine. Power source 14 alternately may be a non-combustion source of power such as, for example, a fuel cell, a power storage device, or any other source of power. Thus, power source 14 is not limited to any particular type of power source.

An implement 16 may be connected to machine 10, and may be used by an operator of machine 10 to perform work. FIG. 1 shows implement 16 as a blade, connected to the front of machine 10, which is capable of being used to move ground or material on the ground surface underneath machine 10, or to carry material over the ground surface. Implement 16 is not limited to being a blade, however, and may be, for example, a bucket, a fork, a ripper, or any other tool capable of being used by machine 10 to perform work, such as by shaping, contouring, or moving ground or material underneath machine 10, or carrying material over the ground surface. Further, implement 16 is not limited to being connected to the front of machine 10, and instead may be connected at another location on machine 10, such as the back or side of machine 10.

A sprocket 18 may be disposed on each side of machine 10. Each sprocket 18 may be rotationally-driven by power source 14. A track assembly 20 also may be disposed on each side (e.g., a left side and a right side) of machine 10. Each track assembly 20 may include a plurality of track links 22 that are connected to one another by track pin assemblies 24. Shoes 26, which are configured to engage a ground surface under machine 10, may be connected to tracks link 22. Each of the track assemblies 20 may form an endless or closed loop, and each closed loop may be supported by two pulley mechanisms 28 that are spaced apart from one another on one side of machine 10. By this arrangement, each sprocket 18 that is rotated by power source 14 may engage and transmit torque to track pin assemblies 24, resulting in movement of one track assembly 20 around two sets of pulley mechanisms 28.

As further shown in FIG. 1, machine 10 may include a controller 29. Controller 29 may control, for example, a speed of one or both track assemblies 20, based on information from different systems or subsystems of machine 10, including information or data from monitoring track assemblies 20 themselves and/or implement 16. The information or data received by controller 29 may be received from one or more sensors, for example, so that the speed of each track assembly 20 may be determined and/or a load exerted on implement 16 may be determined. Under certain circumstances, controller 29 may adjust the speed of one or both track assemblies 20, to prevent shoes 26 of both track assemblies 20 from being or remaining in phase with one another (e.g., to prevent shoes 26 on both side of machine 10 from coming into and out of contact with the ground surface at the same time). Further details of controller 29 are discussed below with reference to FIG. 3.

Figure 2:
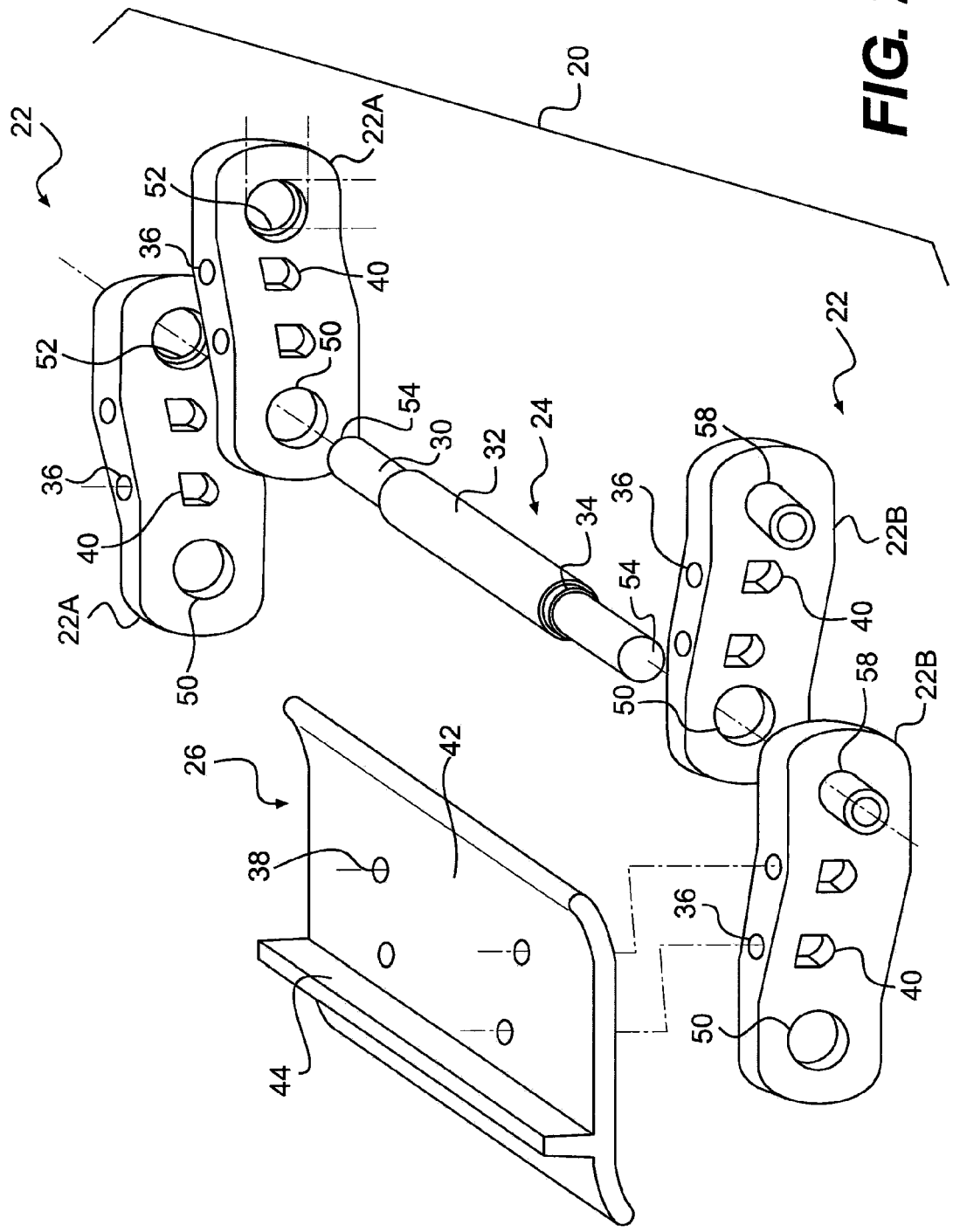
FIG. 2 is an exploded illustration of an exemplary track assembly of the mobile machine of FIG. 1, consistent with the disclosure.

FIG. 2 illustrates a portion of one of the track assemblies 20 which includes four track links 22, one track pin assembly 24, and one shoe 26. As shown in FIG. 2, track links 22 may include track links 22a and track links 22b. Track links 22a and 22b may be mirror images of each other, and may be disposed opposite one another within track assembly 20, such that track links 22a form one side of track assembly 20, while track links 22b form the opposite side of track assembly 20. When the components shown in FIG. 2 are assembled with one another, one track pin assembly 24 may be used to connect four track links 22 (e.g., two track links 22a and two track links 22b), one shoe 26 may be connected to one track link 22a and one track link 22b, and another shoe 26 (not shown) may be connected to the other track link 22a and the other track link 22b. Although the figures show specific examples of track links 22, the disclosure is not limited to a system or a method that includes track links 22a and 22b as illustrated in FIG. 2. Instead, the disclosed system and method may be used with any type of track link that forms a track assembly usable by a track-type mobile machine, such as a belted track system used by an agricultural tractor or a multi terrain loader (MTL).

As shown in FIG. 2, each track pin assembly 24 that connects track links 22 may include a track pin 30, a bushing 32, and at least one retention ring 34. Bushing 32 may be disposed on track pin 30, such that bushing 32 rotates relative to track pin 30. By this arrangement, rotationally-driven sprocket 18 (FIG. 1) may engage bushing 32, and bushing 32 may rotate on track pin 30 with sprocket 18. As a result of the force applied to bushing 32, track pin 30 may translate, resulting in movement of track assembly 20 around two pulley mechanisms 28 (FIG. 1), as described above, to move the machine on the ground surface.

Retention ring 34 may be disposed on one side of track pin 30, so as to act as a stop that positions bushing 32 on track pin 30 when bushing 32 contacts retention ring 34. Consistent with the disclosure, two retention rings 34, one on each end of track pin 30, may be used to position and retain bushing 32 on track pin 30. Alternately, retention ring 34 may be omitted entirely from track pin assembly 24. In this arrangement, bushing 32 may be retained on track pin 30 by the two links 22 (e.g., one track link 22a and one track link 22b) that are disposed on either side of bushing 32.

Each track link 22a and 22b may include one or more through holes 36, while each shoe 26 may include corresponding through holes 38. Each track link 22a and 22b may also include one or more openings 40 aligned with through holes 36. By this arrangement, threaded fasteners such as bolts (not shown) may be disposed within through holes 36 and 38 to attach shoes 26 to track links 22a and 22b, and corresponding threaded fasteners such as nuts (not shown) may be disposed on the ends of the bolts. Openings 40 may be formed to facilitate placement or tightening of the nuts on the ends of the bolts, such as by being sized, shaped, or located to accommodate a tool that may be used to tighten the nuts.

Each shoe 26 may include a substantially rectangular planar base 42 forming a ground-engaging surface. Shoe 26 may also include a grouser 44 extending outwardly from planar base 42. Grouser 44 may increase the traction of track assemblies 20 on the ground surface under the machine. Although FIG. 2 shows shoe 26 including a single grouser, shoe 26 is not limited to one grouser 44. For example, each shoe 26 may include a plurality of grousers 44, such as three grousers 44. Further, although FIG. 2 shows grouser 44 in the shape of a bar with a rectangular cross section, grouser 44 is not limited to this shape. For example, grouser 44 may be a plurality of bars, one or more spikes, one or more curves, or combinations of these or different shapes. Grousers 44 may be permanently attached to shoes 26, such as by welding, or may be removably attached, such as by being bolted, to shoes 26 for ease of replacement.

Although FIG. 2 shows a specific example of shoe 26, the disclosed embodiments are not limited to a system or a method that includes shoes 26. Instead, the disclosed embodiments may be used with any type of shoe forming a part of a track assembly used by a track-type mobile machine. Alternately, shoes may be omitted entirely from track assemblies 20, so that surfaces of track links 22a and 22b that would otherwise contact shoes 26 may contact the ground surface under the machine.

Each of track links 22a and 22b may define a plurality of additional through holes configured to accept at least a portion of track pin assemblies 24. For example, each track link 22a and 22b may include a through hole 50 formed on one end of the track link. Each through hole 50 may be configured to receive a portion of track pin 30 and be disposed proximate and/or in contact with an end face of bushing 32 or an end face of retaining ring 34, when track assembly 20 is assembled. When track assembly 20 is assembled, track pin assembly 24 may rotate within or relative to through hole 50. Thus, a diameter of through hole 50 may be greater than a diameter of the portion of track pin 30 disposed within through hole 50. A bearing set (not shown), such as a roller bearing assembly, may be disposed within through hole 50 and/or on the portion of track pin assembly 24 that is disposed within through hole 50.

Each of track links 22a and 22b may also include a through hole 52, which is formed on an end of the track link that is opposite the end on which through hole 50 is formed. Each through hole 52 may be configured to receive a portion of track pin 30 that is proximate a free end 54 of track pin 30. When track assembly 20 is assembled, track pin 30 of track pin assembly 24 may be prevented from rotating within or relative to through holes 52 of the two track links 22a and 22b that track pin 30 connects, although bushing 32 disposed on track pin 30 may be permitted to rotate relative to track links 22a and 22b and track pin 30. For example, both of the free ends 54 of each track pin 30 may be connected to material of track links 22a and 22b which surrounds through holes 52. Connections between track pins 30 and the material surrounding through holes 52 may be formed by sizing a diameter of each through hole 52 to be approximately a same size as or slightly smaller than a diameter of free end 54 of track pin 30 that is disposed within through hole 52. By this arrangement, an interference fit may be achieved between track pin 30 and the material of track links 22a and 22b which surrounds through hole 52. Consistent with the disclosure, this connection between track pin 30 and track links 22a and 22b may be omitted entirely from each of track assemblies 20.

Each track link 22a and 22b may include a boss 58 that surrounds each of the two through holes 52. Each boss 58 may be used to form another connection with free end 54 of track pin 30. These connections may be in addition to or in place of the above-discussed interference fits. Specifically, an axis of boss 58 may be approximately co-linear and approximately parallel to an axis of through hole 52 that is surrounded by boss 58. Thus, when track pin 30 is inserted in through hole 52, the axis of track pin 30 may be approximately co-linear and approximately parallel to the axes of boss 58 and/or through hole 52. An end face of boss 58 may be approximately coplanar with an end face of free end 54. The connection may be formed, for example, by a weld, or by plastically deforming the material of either or both of boss 58 and track 30. When the material of one or both of boss 58 and track 30 is plastically deformed, one or more channels (not shown) may be provided in either or both of boss 58 and track 30, into which the plastically-deformed material may flow, to provide the connection. The connection between boss 58 and track pin 30 is not limited to welding or material deformation, however, but instead may be any connection between boss 58 and track pin 30. Consistent with the disclosure, this connection may be omitted entirely from track assembly 20, and pins 30 may be retained in track links 22 solely by the above-discussed interference fits, for example.

Figure 3:
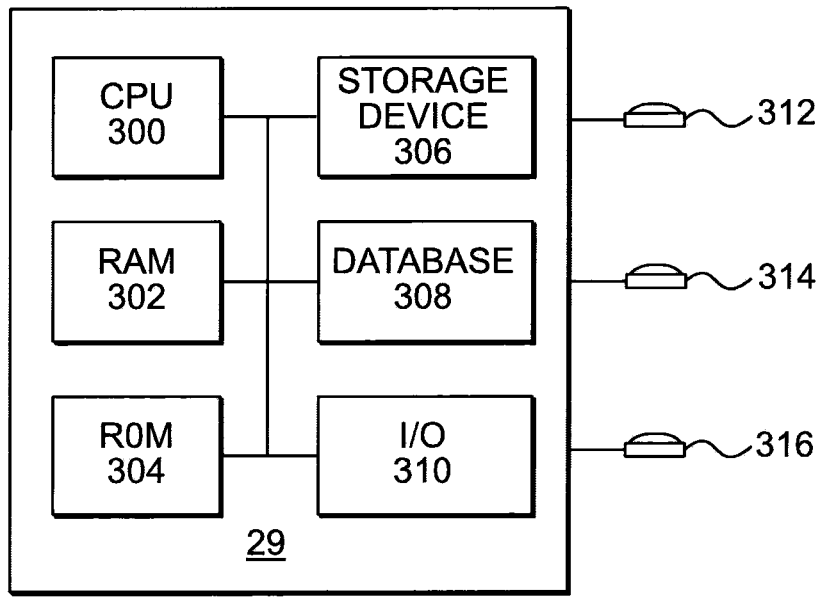
FIG. 3 illustrates a schematic view of an exemplary controller of the mobile machine of FIG. 1, consistent with the disclosure.

FIG. 3 illustrates components of controller 29 in greater detail, consistent with the disclosure. As stated above, under certain circumstances controller 29 may adjust the speed of one or both track assemblies 20 (FIG. 1), to prevent shoes 26 (FIG. 1) of both track assemblies 20 from being or remaining in phase with one another (e.g., to prevent shoes 26 on both sides of machine 10 from coming into and out of contact with the ground surface at approximately the same time).

Controller 29 may include any type of processor-based system on which processes and methods consistent with the disclosure may be implemented. For example, as illustrated in FIG. 3, controller 29 may include one or more hardware and/or software components configured to execute software programs, which determine the speed of each track assembly 20. Specifically, controller 29 may include one or more hardware components such as a central processing unit (CPU) (processor) 300, a random access memory (RAM) module 302, a read-only memory (ROM) module 304, a storage device 306, a database 308, and one or more input/output (I/O) devices 310. Alternatively and/or additionally, controller 29 may include one or more software components such as, for example, a tangible, non-transitory computer-readable storage medium including computer-executable instructions to perform methods and processes consistent with the disclosure. It is contemplated that one or more of the hardware components listed above may be implemented using software. For example, storage device 306 may include a software partition associated with one or more other hardware components of controller 29. Controller 29 may include additional, fewer, and/or different components than those listed above. It is understood that the components listed above are exemplary only and not intended to be limiting.

Processor 300 may include one or more computer processors, each configured to execute instructions and/or process data to perform one or more functions associated with controller 29. As illustrated in FIG. 3, processor 300 may be communicatively coupled to RAM 302, ROM 304, storage device 306, database 308, and I/O devices 310. Processor 300 may be configured to execute sequences of computer program instructions to perform various processes. The computer program instructions may be loaded into RAM 302, for example, for execution by processor 300.

RAM 302 and/or ROM 304 may each include one or more devices for storing information associated with an operation of controller 29 and/or processor 300. For example, ROM 304 may include a memory device configured to access and store information associated with controller 29, including information for identifying, initializing, and monitoring the operation of one or more components and subsystems of controller 29. RAM 302 may include a memory device for storing data associated with one or more operations of processor 300. For example, ROM 304 may load instructions into RAM 302 for execution by processor 300.

Storage device 306 may include any type of tangible, non-transitory mass storage device configured to store information that processor 300 may use to perform processes consistent with the disclosure. For example, storage device 306 may include one or more magnetic and/or optical disk devices, such as hard drives, CD-ROMs, DVD-ROMs, or any other type of mass media device.

Database 308 may include one or more software and/or hardware components that cooperate to store, organize, sort, filter, and/or arrange data used by controller 29 and/or processor 300. For example, database 308 may include one or more look-up tables storing information related to differences in speeds between track assemblies 20 and the corresponding differences in phases of track assemblies 20, which may be used when adjusting the speeds of track assemblies 20. It is contemplated that database 308 may store additional and/or different information than that described above.

I/O devices 310 may include one or more components configured to communicate information with a user associated with controller 29. For example, I/O devices 310 may include a console with an integrated keyboard and mouse to allow a user to input parameters associated with controller 29. I/O devices 310 may also include a display including a graphical user interface (GUI) for inputting and outputting information on a monitor. I/O devices 310 may further include peripheral devices such as a printer for printing information associated with controller 29, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Controller 29 may be communicatively coupled to multiple sensors, each of which may be configured to measure at least one operational aspect associated with machine 10. As shown in FIG. 3, speed sensors 312 and 314 may be two of the sensors communicatively coupled to controller 29. For example, speed sensor 312 may be configured to sense a parameter associated with the speed of track assembly 20 on the left side of machine 10, while speed sensor 314 may be configured to sense a parameter associated with the speed of track assembly 20 on the right side of machine 10.

In particular, speed sensor 312 may be configured to sense a speed of rotation of a component of a drive motor, a transmission, a differential, a clutch, or any other component associated with movement of the left-side track assembly 20. Similarly, speed sensor 314 may be configured to sense a speed of rotation of a drive motor, a transmission, a differential, a clutch, or any other component associated with movement of the right-side track assembly 20. Speed sensors 312 and 314 may be Hall Effect sensors that sense rotations of magnetic gear teeth. Speed sensors 312 and 314 are not limited to being Hall Effect sensors or any other type of magnetic-field sensors, however, and are not limited to sensing gear rotations. Rather, each speed sensor 312 and 314 may be any type of sensor that senses any characteristic indicative of the movement of track assemblies 20. For example, one or more inertial measurement units (IMUs) may be used. Speed sensors 312 and 314 may be configured to output signals based on the sensed speeds of the track assemblies 20.

As further illustrated in FIG. 3, an implement sensor 316 also may be communicatively coupled to controller 29. Implement sensor 316 may be configured to sense a parameter associated with a load exerted on implement 16 (FIG. 1). For example, implement sensor 316 may be a strain gauge load cell configured to measure a load supported by implement 16, or a hydraulic or hydrostatic system that measures a load exerted on one or more hydraulic components (not shown) associated with support and/or movement of implement 16. Implement sensor 316 is not limited to any of these particular systems, however, but may include any system or component that determines either the magnitude of the load exerted on implement 16 or whether the load exerted on implement 16 is above or below a threshold value, and which outputs one or more signals accordingly.

As stated above, controller 29 may control the speed of either or both track assemblies 20 based on signals from speed sensors 312 and 314 as well as implement sensor 316. In particular, controller 29 may use the information from sensors 312, 314, and 316 to determine whether the speeds of both track assemblies 20 are approximately the same as each other and whether the load exerted on implement 16 is less than the threshold value, indicating that track assemblies 20 may be in phase with one another, and in response may alter the speed of either or both track assemblies 20 so that the track assemblies become out of phase with one another. Exemplary operations of controller 29, as well as associated methods of driving track assemblies 20 which may be performed by controller 29, are discussed below with reference to FIG. 4.

INDUSTRIAL APPLICABILITY

Figure 4:
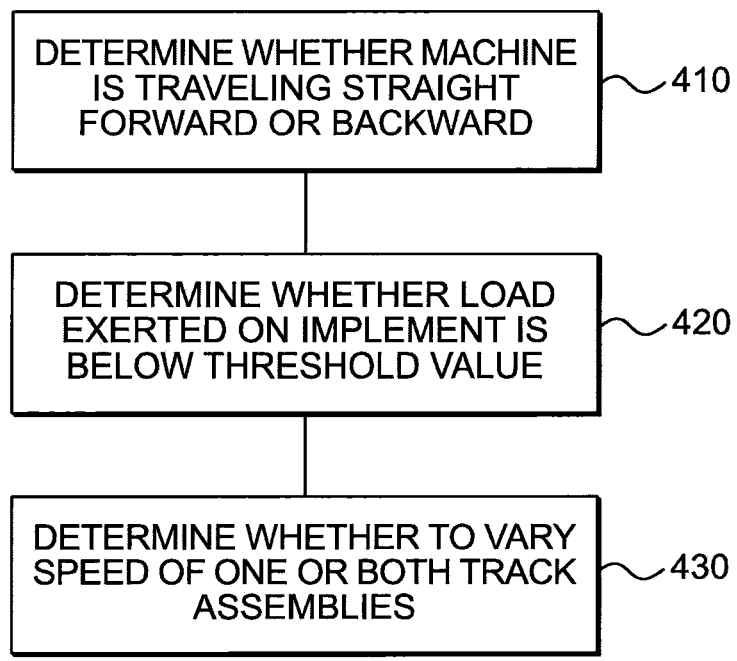
FIG. 4 illustrates an exemplary method of operating the controller of FIG. 3, consistent with the disclosure.

The disclosed track drive system and method may be applicable to any machine having track assemblies. The following discussion, with reference to FIG. 4, provides an exemplary method of driving the left-side and right-side track assemblies so that the track assemblies are prevented from being or remaining in phase with each other. FIG. 4 illustrates specific examples of how the controller may determine that the track assemblies are in phase, and adjust the track assemblies so as not to remain in phase. It is to be understood, however, that the disclosed system and method are not limited to these specific steps.

As shown in the method of FIG. 4, in Step 410 a determination may be made as to whether machine 10 is traveling approximately straight forward or backward. For example, controller 29 may receive data from speed sensor 312, which as discussed above may be configured to sense the speed of rotation of a component associated with movement of the left-side track assembly 20 and then output a signal. Controller 29 may also receive data from speed sensor 314, which as discussed above may be configured to sense the speed of rotation of a component associated with movement of the right-side track assembly 20 and then output a signal. By comparing the signals from each of speed sensors 312 and 314, controller 29 may determine whether the speeds of left-side and right-side track assemblies are approximately the same, indicating that machine 10 may be traveling approximately straight forward or backward. Specifically, controller 29 may determine that machine 10 is traveling approximately straight forward or backward when the speeds are approximately the same, which may occur when the difference between the speed of the left-side track assembly 20 and the right-side track assembly 20 is less than a threshold value. This determination may be useful because it has been observed that when a mobile machine travels straight forward or backward, the shoes and grousers on the left-side track assembly and the right-side track assembly may end up in phase with one another (i.e., the grousers of the left side of the machine may end up coming into and out of contact with the ground surface at the same time as the grousers on the right side of the machine).

Although the description of Step 410 uses speed sensors 312 and 314 to sense the speed of the left-side and the right-side track assemblies 20, the current disclosure is not limited to the use of these sensors. Any sensor or component may be used which is capable of monitoring a parameter indicative of or corresponding to the speeds of the left-side and the right-side track assemblies 20. Further, although the description describes controller 29 determining whether the left-side and the right-side track assemblies 20 may be at the same speed and thus traveling straight forward or backward, the current disclosure does not require the use of controller 29. Any controller, processor, or other component may be used in this determination.

In Step 420 a determination may be made as to whether the load being exerted on implement 16 of machine 10 is below the threshold value. For example, controller 29 may receive data from implement sensor 316. Implement sensor 316 may be configured to output a signal that varies based on the magnitude of the sensed load exerted on implement 16, or alternately sensor 316 may be configured to output a signal when the load exerted on implement 16 is sensed to be either greater than or less than the threshold value. In another embodiment, the engine load factor may be used to determine the load on the machine, and sensor 316 may be any sensor sensing a characteristic used by an engine control module or another processor to compute this factor. This determination may be useful because it has been observed that when the load exerted on an implement is less than a threshold value the shoes and grousers on the left-side track assembly and the right-side track assembly may end up in phase with one another. Depending on numerous factors, such as the type of machine, the weight of the machine, characteristics of the ground surface, environmental conditions in which the machine is operating, the type of the implement, the weight of the implement, etc., the threshold value may be zero, or may be a value greater than zero but less than a maximum load the implement may support.

Although the description of Step 420 uses implement sensor 316, the current disclosure is not limited to the use of this sensor. Any sensor or component may be used which is capable of monitoring a parameter indicative of or corresponding to the magnitude of the load exerted on implement 16 or whether the load exerted on implement 16 is above or below the threshold value. Further, although the description describes the use of controller 29, consistent with the current disclosure any controller, processor, or other component may be used in this determination. Also consistent with the disclosure, the determination in Step 420 need not be made after or subsequent to the determination in Step 410, and instead may be made before or at approximately the same time as the determination in Step 410. The determinations in Steps 410 and 420 may be made at different times that are relatively close to one another, or alternately may be made at different times that are separated by a relatively long time interval.

The results of Steps 410 and 420 may be used to determine whether left-side and right-side track assemblies 20 may be in phase with one another, and/or the extent to which left-side and right-side track assemblies 20 may be in phase. The disclosed system and method are not limited to the above-described example, however. For example, controller 29 and/or another processor may determine that left-side and right-side track assemblies 20 may be in phase by sensing an orientation of sprockets 18 (and/or other components for each of track assemblies 20). For example, position sensors may be two of the sensors communicatively coupled to controller 29, and each position sensors may be configured to sense a position of sprocket 18, or a component of the drive motor, the transmission, the differential, the clutch, or any other component associated with movement of left-side track assembly 20 and with right-side track assembly 20. When it is determined that left-side and right-side track assemblies 20 may be in phase, and/or the degree to which left-side and right-side track assemblies 20 may be in phase is greater than a threshold value, the process may continue to the following step.

In Step 430, a determination may be made as to whether the speed of one or both track assemblies 20 may be varied, based on the results of the determinations in Steps 410 and 420. For example, controller 29 may determine that grousers 44 of shoes 26, for both of the left-side and right-side track assemblies 20, may be in phase with each other. This determination may be made when either or both of (i) the difference in the speeds of the left-side and right-side track assemblies 20 are less than the threshold value, and (ii) the load exerted on implement 16 is less than the threshold value. Regardless of how controller 29 makes the determination, when controller 29 determines that track assemblies 20 may be in phase with one another, controller 29 may send a signal that temporarily slows or speeds up either or both track assemblies 20. For example, controller 29 may send a signal to a drive motor, a transmission, a differential, a clutch, or any other component associated with movement of the left-side track assembly 20 so that the left-side track assembly is temporarily sped up or slowed down, and/or may send a signal to a drive motor, a transmission, a differential, a clutch, or any other component associated with movement of the right-side track assembly 20 so that the right-side track assembly is temporarily sped up or slowed down, such that the speeds of track assemblies 20 may temporarily differ from one another.

The speed of one or both track assemblies 20 may be increased and/or decreased in a way that is imperceptible to the operator of machine 10 (e.g., either the magnitude of the increase or decrease in speed, or the time interval during which the speed is varied, is sufficiently small), such that machine 10 continues approximately straight forward or backward without perceptively turning. The speed of one or both track assemblies 20 may also be adjusted to the extent that track assemblies 20 become completely out of phase with one another, such that a grouser on the left-side track assembly 20 comes into contact with the ground surface approximately midway through a time interval during which grousers from two different shoes on the right-side track assembly 20 come into contact with the ground surface, for example. Controller 29 may repeat Steps 410, 420, and 430, as appropriate, such that left-side and right-side track assemblies 20 are prevented from being or remaining in phase with each other throughout operation of machine 10.

The above system and method of driving track assemblies provide numerous advantages over a mobile machine that does not prevent the left-side and right-side track assemblies from remaining in phase with each another. For example, the machine in accordance with the disclosure may avoid the significant increase in vertical acceleration (e.g., acceleration in a direction approximately perpendicular to a horizontal surface over which machine 10 travels) caused by the track assemblies being in phase, and thus may decrease undesired vibrations during operation of the machine which result in operator discomfort and fatigue, as well as decreased life of machine components.

Consistent with the disclosure, other information, data, or signals may be used to determine whether track assemblies 20 are in phase, and/or to adjust the speed of one or both of left-side and right-side track assemblies 20 so as not to remain in phase. For example, the presence of absence of steering inputs, and/or the measurement of the presence or absence of vertical acceleration experienced by machine 10, may be used in the determination. Further, the operator of machine 10 may be permitted to control whether the disclosed system or method is active, or to determine under what conditions the system and method may be automatically activated.

It will be apparent to those skilled in the art that various modifications and variations can be made to the disclosed track drive system and method. Other embodiments will be apparent to those skilled in the art from consideration of the specification and practice of the disclosed systems and method. It is intended that the specification and examples be considered as exemplary only, with a true scope being indicated by the following claims and their equivalents.

What is claimed is:

1. A method of driving a mobile machine that comprises a left-side track assembly and a right-side track assembly for propelling the machine and an implement for performing work, the method comprising:
   determining whether the machine is traveling approximately straight forward or backward;
   determining whether a load exerted on the implement is less than a threshold load value; and
   outputting, with a controller, a signal to adjust a speed of the left-side track assembly or a speed of the right-side track assembly when the machine is traveling approximately straight forward or backward and the load exerted on the implement is less than the threshold load value, to thereby bring the left-side track assembly out of phase with the right-side track assembly.

2. The method of claim 1, wherein determining whether the machine is traveling approximately straight forward or backward comprises determining whether a difference between the speed of the left-side track assembly and the speed the right-side track assembly is less than a threshold speed value.

3. The method of claim 2, wherein outputting comprises outputting the signal to adjust the speed of the left-side track assembly and the speed of the right-side track assembly.

4. The method of claim 2, wherein outputting comprises outputting the signal to adjust the speed of only one of the left-side track assembly or the right-side track assembly.

5. The method of claim 2, wherein outputting comprises outputting the signal to increase the speed of one of the left-side track assembly and the right-side track assembly, and to decrease the speed of the other one of the left-side track assembly and the right-side track assembly.

6. The method of claim 2, wherein the left-side track assembly comprises grousers configured to contact a ground surface under the machine,
wherein the right-side track assembly comprises grousers configured to contact the ground surface, and
wherein outputting comprises outputting the signal to adjust the speed of one of the left-side track assembly and the right-side track assembly, so that one of the grousers of the left-side track assembly contacts the ground surface approximately midway through a time interval between two of the grousers of the right-side track assembly contacting the ground surface.

7. The method of claim 2, wherein the left-side track assembly comprises shoes including grousers configured to contact a ground surface under the machine,
wherein the right-side track assembly comprises shoes including grousers configured to contact the ground surface, and
wherein outputting comprises outputting the signal to adjust the speed of the left-side track assembly and to adjust the speed of the right-side track assembly, so that one of the grousers of the left-side track assembly contacts the ground surface approximately midway through a time interval between two of the grousers from two different shoes of the right-side track assembly contacting the ground surface.

8. The method according to claim 1, wherein determining whether the machine is traveling approximately straight forward or backward comprises
sensing the speed of the left-side track assembly with a speed sensor,
sensing the speed of the right-side track assembly with a speed sensor, and
determining whether a difference between the sensed speeds is less than a threshold speed value.

9. The method of claim 8, wherein sensing the speed of the left-side track assembly comprises sensing a speed of rotation of a drive motor, a transmission, a differential, or a clutch, which is associated with movement of the left-side track assembly, and
sensing the speed of the right-side track assembly comprises sensing a speed of rotation of a drive motor, a transmission, a differential, or a clutch, which is associated with movement of the right-side track assembly.

10. The method of claim 9, wherein sensing the speed of the left-side track assembly comprises sensing a rotation of a gear of the drive motor, the transmission, the differential, or the clutch, which is associated with movement of the left-side track assembly, and
wherein sensing the speed of the right-side track assembly comprises sensing the rotation of a gear of the drive motor, the transmission, the differential, or the clutch, which is associated with movement of the right-side track assembly.

11. The method of claim 2, wherein determining whether the load exerted on the implement is less than the threshold value comprises either sensing the load exerted on a hydraulic component used in moving or supporting the implement or determining an engine load factor.

12. The method of claim 11, wherein the implement comprises a blade, a bucket, a ripper, or a fork.

13. The method of claim 2, wherein determining whether the load exerted on the implement is less than the threshold value comprises sensing a magnitude of the load exerted on the implement.

14. A method of driving a mobile machine that comprises a left-side track assembly and a right-side track assembly for propelling the machine and an implement for performing work, the method comprising:
sensing a speed of the left-side track assembly;
sensing a speed the right-side track assembly;
determining whether a difference between the sensed speeds is less than a threshold speed value;
determining whether a load exerted on the implement is less than a threshold load value; and
outputting, with a controller, a signal to adjust a speed of the left-side track assembly or a speed of the right-side track assembly when the difference between the sensed speeds is less than the threshold speed value and the load exerted on the implement is less than the threshold load value, to thereby bring the left-side track assembly out of phase with the right-side track assembly.

15. The method of claim 14, wherein outputting comprises outputting the signal to adjust the speed of the left-side track assembly and the speed of the right-side track assembly.

16. The method of claim 14, wherein outputting comprises outputting the signal to increase the speed of one of the left-side track assembly and the right-side track assembly, and decrease the speed of the other one of the left-side track assembly and the right-side track assembly.

17. The method of claim 14, wherein determining whether the load exerted on the implement is less than the threshold value comprises sensing the load exerted on a hydraulic component used in moving or supporting the implement.

18. A controller storing a computer program that, when executed by the controller, performs a method of driving a mobile machine that comprises a left-side track assembly and a right-side track assembly for propelling the machine and an implement for performing work, the method comprising:
determining whether the machine is traveling approximately straight forward or backward;
determining whether a load exerted on the implement is less than a threshold load value; and
outputting, with a controller, a signal to adjust a speed of the left-side track assembly or a speed of the right-side track assembly when the machine is traveling approximately straight forward or backward and the load exerted on the implement is less than the threshold load value, to thereby bring the left-side track assembly out of phase with the right-side track assembly.

19. The controller of claim 18, wherein in the method determining whether the machine is traveling approximately straight forward or backward comprises determining whether a difference between the speed of the left-side track assembly and the speed the right-side track assembly is less than a threshold speed value.

20. The controller of claim 19, wherein in the method outputting comprises outputting the signal to adjust the speed of one of the left-side track assembly and the right-side track assembly, so that a grouser of a shoe of the left-side track assembly contacts the ground surface approximately midway through a time interval between which two grousers of two different shoes of the right-side track assembly contact the ground surface.

\* \* \* \* \*